Feb. 27, 1934.  H. S. SIMPSON  1,948,805

SAND MIXER

Original Filed Aug. 18, 1932     8 Sheets-Sheet 1

Inventor
HERBERT S. SIMPSON,

Attorneys

Feb. 27, 1934.  H. S. SIMPSON  1,948,805
SAND MIXER
Original Filed Aug. 18, 1932  8 Sheets-Sheet 3

Inventor
HERBERT S. SIMPSON,
Attorneys

Feb. 27, 1934.    H. S. SIMPSON    1,948,805
SAND MIXER
Original Filed Aug. 18, 1932    8 Sheets-Sheet 5

Feb. 27, 1934. H. S. SIMPSON 1,948,805
SAND MIXER
Original Filed Aug. 18, 1932 8 Sheets-Sheet 6

HERBERT S. SIMPSON, Inventor

Patented Feb. 27, 1934

1,948,805

UNITED STATES PATENT OFFICE 1,948,805

SAND MIXER

Herbert S. Simpson, Chicago, Ill., assignor to The Standard Sand & Machine Company, Chicago, Ill., a corporation of Ohio Original application August 18, 1932, Serial No. 629,270. Divided and this application January 24, 1933. Serial No. 653,291

2 Claims. (Cl. 22—217)

This invention relates to improvements in sand mixers, and has for its object to provide a sand mixer for conditioning used foundry sand as well as for providing new sand mixtures for molding purposes in foundries.

It is an object of this invention to provide a sand mixer in which the feed hopper is located on or beneath the surface of the ground, means for elevating the sand to a screen from which the sand is discharged into a mixer, and means in the mixer for properly tempering and thoroughly mixing the sand by causing alternating movements of the sand material from end to end of the mixing trough, together with a smearing action on the material that thoroughly infuses the elements of the mixture.

It is another object of this invention to provide, in connection with a sand mixer, paddles which have on the ends thereof adjustable and removable hard iron tips made of a special mixture to resist wear.

It is another object of this invention to provide, in connection with a mixer, means for applying a definite amount of water to the sand within the mixer, either continuously to a continuously supplied amount of sand, or a definite amount of water to a definite batch of sand.

It is a further object of this invention to provide, in connection with the mixer trough, clean-out doors on the sides thereof which are readily removable for cleaning purposes so that the trough may be cleaned without disturbing the screen located above it.

It is a further object to provide a continuous process for treating sand. This process relates to the removal of the sand from a bin or pit in which the sand is stored, and operating upon the sand until it is conditioned for use.

It is an object of my invention to provide apparatus of different level so that the point of discharge into the system is below and adjacent to the point of discharge from the system in order to economize in the delivery and removal of material to be treated and material that has been treated.

It is a further object to provide power means so interconnected to various elements of the system as to synchronize their movements so as to thereby regulate and accommodate the size of the parts and the speed of the parts to the flow of material therethrough in order to maintain the proper proportioning and treating of the material.

These and other advantages will appear from the following description taken in connection with the drawings.

Referring to the drawings.

This application is a division of my application, Serial No. 629,270, filed August 18, 1932.

Figures 1, 6:
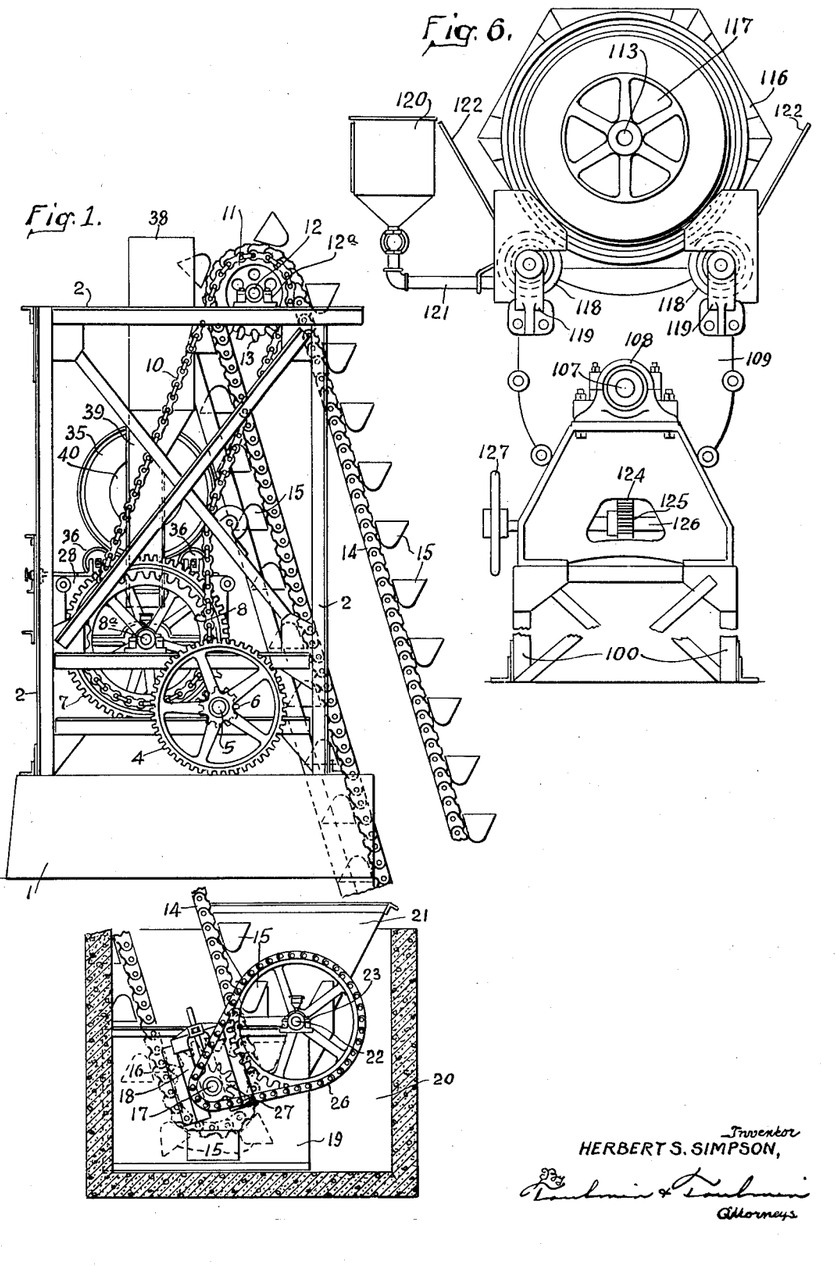
Figure 1 is a side elevation of an inclined type of loading apparatus. The lower part of the apparatus is broken off and slightly displaced from the other part thereof.
Figure 6 is the other end of the apparatus shown in Figure 5.
Figure 2:
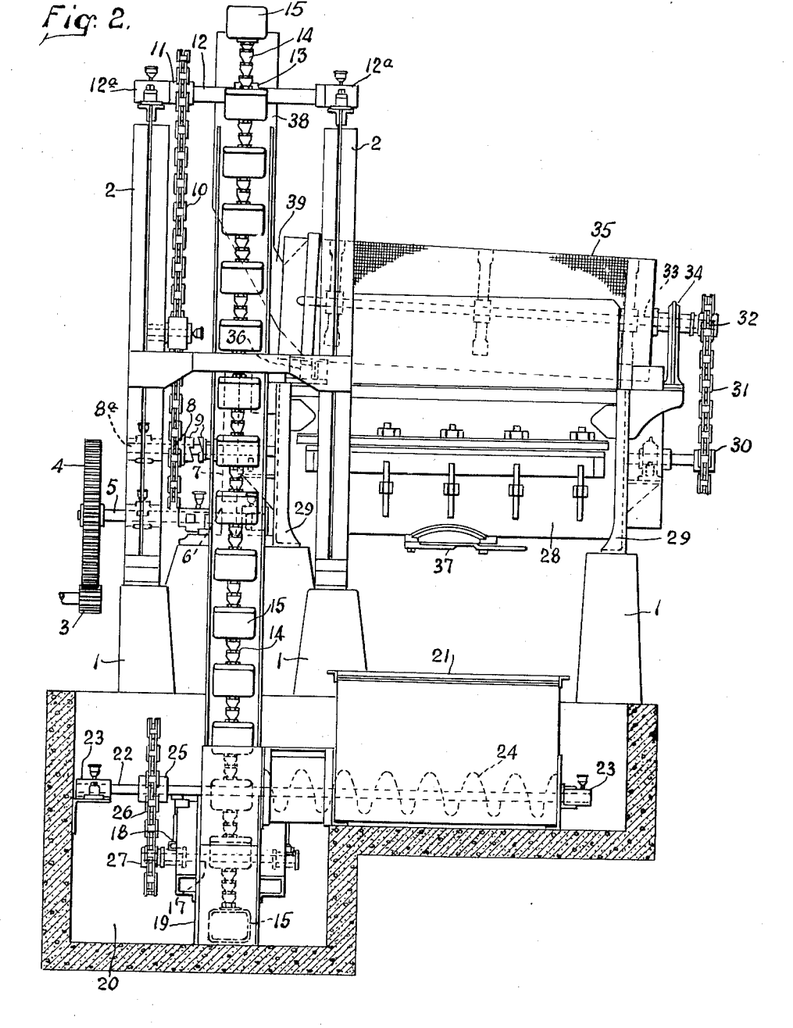
Figure 2 is a front elevation of the loading apparatus shown in Figure 1.

In the form shown in Figures 1 and 2 there is a base 1, upon which a frame structure 2 is mounted for supporting the operating parts. Connected to some source of power, such as a motor shaft, is a drive pinion 3, shown in Figure 2, which meshes with a gear 4 located on one end of a shaft 5 suitably supported by the frame in bearings.

On this shaft 5 is a pinion 6 which meshes with a large gear 7 located on a shaft 8a, on which there is also located a sprocket wheel 8. On this shaft 8a are clutch members 9, by which the sprocket wheel may rotate with the shaft 8a, or independently thereof. Engaging the sprocket wheel is a sprocket chain 10, which extends upwardly therefrom and passes over a second sprocket wheel 11 located on a shaft 12 supported in bearings 12a on top of the frame.

The sprocket wheel 11 is located adjacent one of the bearings 12a. About the middle point of the shaft 12 is a sprocket wheel 13 which carries a sprocket chain 14 on which are buckets 15. This sprocket chain extends downwardly in an inclined direction, and engages a second sprocket wheel 16 located on a shaft 17. This shaft is supported at its ends by means of take-up bearings 18 suitably supported in a housing 19 located in a pit or bin 20, from which the sand is to be loaded.

Located in one side of the bin or pit is a feed hopper 21, the upper surface of which is substantially level with the ground or floor of the building in which the apparatus is located. Extending through the bottom of this hopper is a worm shaft 22 supported at each end by a bearing 23. The worm part of the shaft is indicated by the numeral 24 and is used for removing the sand from the hopper to the housng 19, where it is received by the buckets 15 and conveyed upwardly in an inclined direction.

This shaft 22 is operated by means of a sprocket wheel 25, a sprocket chain 26 and a sprocket wheel 27 located on shaft 17. By means of the foregoing structure power is transmitted from the pinion 3 to the gear 4, to the shaft 8a, shaft 12, sprocket chain 14 to the shaft 17, and from shaft 17 to shaft 22 and the worm thereon.

The mixer as shown in Figure 2 is indicated by the numeral 28 and is supported by a frame structure 29 mounted upon the base 1. The shaft 8a extends through the mixer and has on one end a sprocket wheel 30, which is engaged by a chain 31 that passes over another sprocket wheel 32 located on one end of a short shaft 33 supported by a standard 34 which is suitably supported by the frame structure 29.

To the other end of the shaft 33 is attached one end of a screen roller 35. The other end of this roller is supported for rotation by means of rollers 36. Beneath the mixer is a discharge door 37 supported beneath the mixer so it will swing to one side for opening a discharge outlet.

The sand as it is conveyed upwardly by means of the buckets 15 is dumped into a hopper 38, from which it is discharged through a chute 39 into one end of the screen roller 35. This end of the screen roller is open to receive the discharge end of the chute 39, and is indicated by the numeral 40, as shown in Figure 1.

Figures 3, 5:
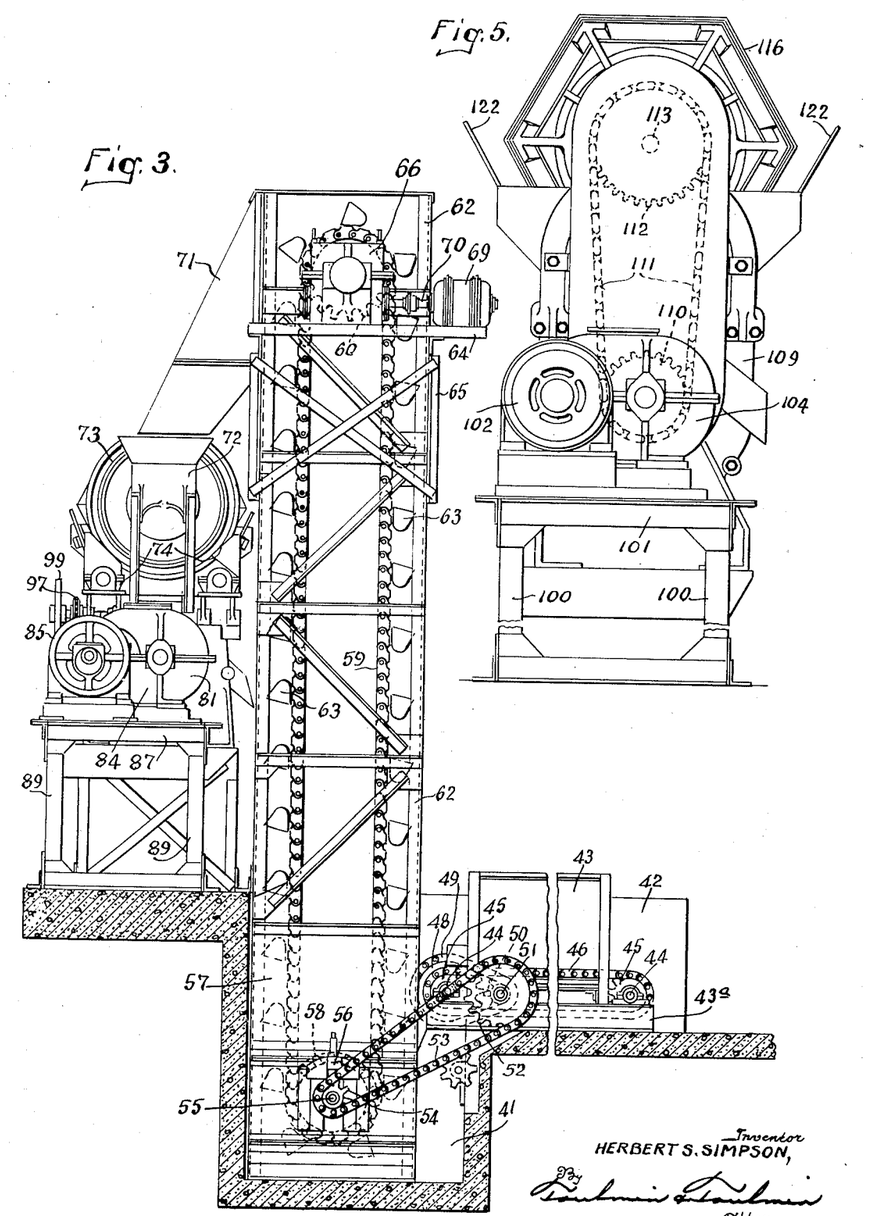
Figure 3 is a side elevation of a slightly modified form of feeding apparatus in which there is a vertical type of feed.
Figure 5 is an end view of one form of screening and mixing apparatus, showing the parallel drive.

In the form shown in Figure 3 the bin or pit is indicated by the numeral 41, which has a shallow part 42 in which is located a hopper 43. Located on the floor of the shallow part of the bin or pit is a frame 43a, which supports a pair of shafts 44, one at each end of the frame. On each of these shafts is a pair of sprocket wheels 45, carrying sprocket chains 46 for operating and supporting a belt or steel apron 47 for feeding the sand from the hopper 43 into a housing 57 located in the deep part of the bin.

There is also located on one of the shafts 44 another sprocket wheel 48, over which a sprocket chain 49 passes and engages a sprocket wheel 50 located in one end of a transverse shaft 51 located between the two shafts 44. On the other end of this shaft 51 is a sprocket wheel 52 engaged by a sprocket chain 53, which passes over another sprocket wheel 54 located on one end of the shaft 55 supported by take-up bearings 56 in the housing 57, which receives the sand from the hopper.

Intermediate the ends of the shaft 55 and within the housing 57 is a sprocket wheel 58 engaged by a sprocket chain 59, which passes upwardly and over a sprocket wheel 60 located on a shaft 61 on top of the frame 62. The sprocket chain 59 carries a plurality of sand hoisting buckets 63. Located near the top of the frame 62 and to one side thereof is a platform 64, which has downwardly extending supporting brackets 65.

On this platform is a reducing gear box 66 which has extending therefrom a shaft 67 connected by means of a connection 68 to the shaft 61. The platform 64 also supports a motor 69, as shown in Figure 3. This motor has a shaft 70, which by suitable connection extends into the reducing gear box and transmits motion to the shafts 67 and 61.

The sand conveyed upwardly by means of the buckets is dumped into a chute 71, from which the sand is discharged into a hopper 72 located at one end of the revolving screen 73. This screen operates in all particulars as the screen described in connection with Figures 1 and 2, and is supported at one end by means of rollers 74 and at the other end by means of a shaft 75 supported on a bracket 76.

Shaft 75, by means of a sprocket chain construction 77, drives a shaft 78 which is supported by bearings 80. The driving mechanism between the shaft 75 and the shaft 78 is inclosed in a casing 79. Shaft 78 extends through the mixer 81 and has thereon paddles for stirring and thoroughly mixing the sand. The shaft 78 is connected to another shaft 82 by means of a coupling 83. This shaft 82 extends into a gear reducing box 84 connected to a motor 85 by means of a motor shaft and connection 86. The motor and reducing gear box are supported on a platform 87 supported by supports 89 and braces 88.

For the purpose of supplying water to the mixer a pipe 90 is provided, which has a valve 91 for regulating the flow of water through the pipe into the mixer. Located in the bottom of the trough of the mixer is a discharge gate 92, operated by a rack 93 engaged by suitable teeth on a shaft 94, which has a sprocket wheel 95 engaged by a chain 96 and operated by a sprocket wheel 97 located on a shaft 98 by means of a hand wheel 99.

Figure 4:
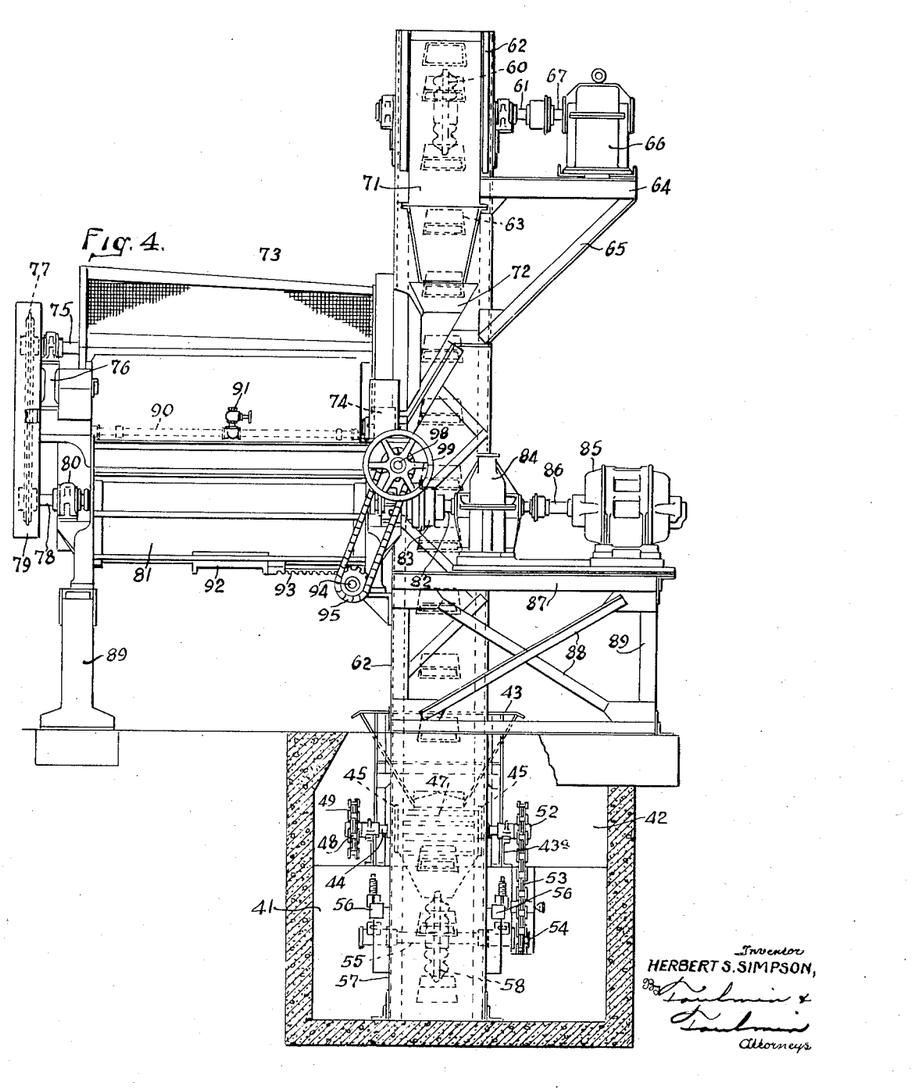
Figure 4 is a side elevation of the apparatus shown in Figure 3.

In the form shown in Figures 3 and 4 the apron for conveying the sand to the buckets and the buckets are operated by one motor, while the screen and the mixer are operated by a second motor. These parts operate independently but may be regulated so that action of one part is somewhat synchronized with the action of the other parts.

Figure 7:
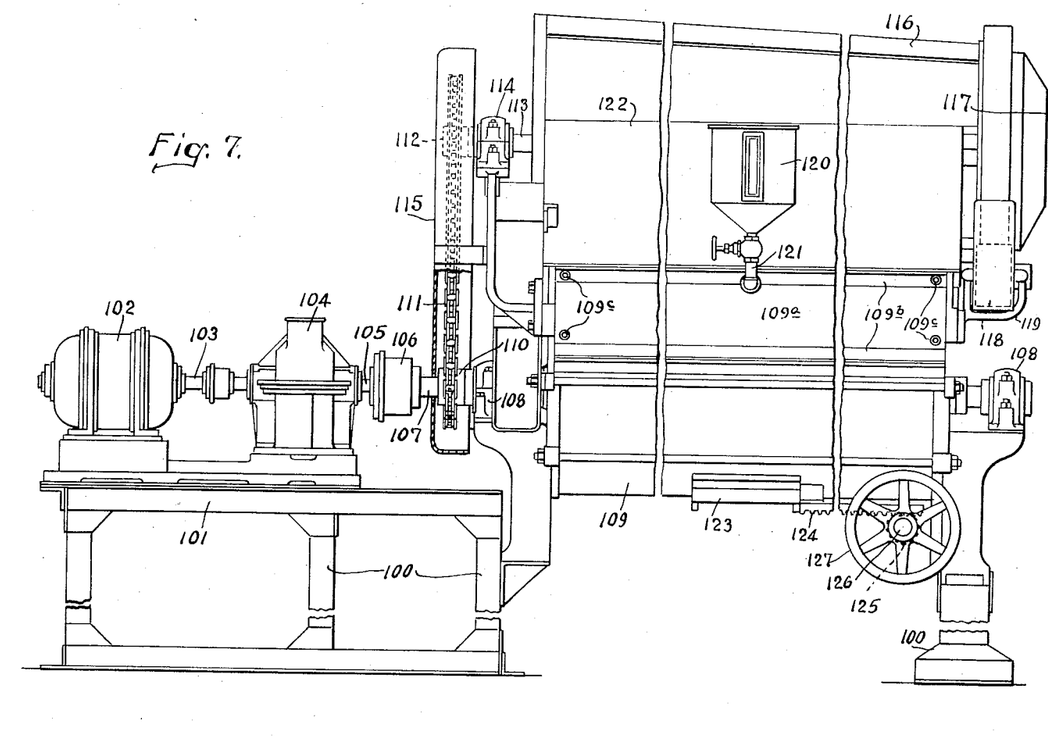
Figure 7 is a side elevation of the apparatus shown in Figures 5 and 6.

In the form shown in Figures 5, 6 and 7 the loading mechanism is omitted and the mixing apparatus is shown for batch mixing purposes; that is, to a definite amount of sand a definite amount of water is applied. In this form the supports for supporting the superstructure are indicated by the numeral 100, which has located thereon a platform 101 for supporting a motor 102, which has a motor shaft 103 in connection, extending into a reduction gear box 104, also supported by the platform.

Extending from the reduction gear box is a shaft 105, which is connected by means of a coupling 106 to a shaft 107 supported by suitable bearings 108 and extending through the mixer 109.

The mixer in all the various forms may be provided, on each side, with a clean-out door 109a, which is readily removable for cleaning out the mixing trough and thereby preventing the building up of the material in the bottom and sides of the trough. By means of this removable door it is unnecessary to disturb the screen at any time for cleaning purposes. These doors are rectangular in shape and have on each side an angle iron 109b by which the doors are suitably attached to the other parts of the mixer by bolts 109c.

On the shaft 107 is a sprocket wheel 110 operating a sprocket chain 111 which passes upwardly and over a sprocket wheel 112 located on shaft 113 supported by a suitable bearing 114. The sprocket wheel 112 is on one end of the shaft 113, which has on its other end, one end of a rotating screen 116 which has in its other end an inlet 117 and is supported by rollers 118 mounted upon the frame 119, suitably attached to one end of the mixer. For the purpose of protecting the sprocket chain 111 and the sprockets engaged thereby there is provided a casing 115.

For supplying a definite amount of water to a definite batch of sand there is provided at one side of the mixer a water tank 120, which is connected to the mixer by means of a pipe 121. On each side of the mixer is a guard 122, which extends part of the way upwardly on each side of the rotating screen. In this form of apparatus a discharge door 123 is located in the bottom of the trough of the mixer, and is operated by means of a rack 124 engaged by a pinion 125 on a shaft 126, which is operated by a hand wheel 127.

Figure 8:
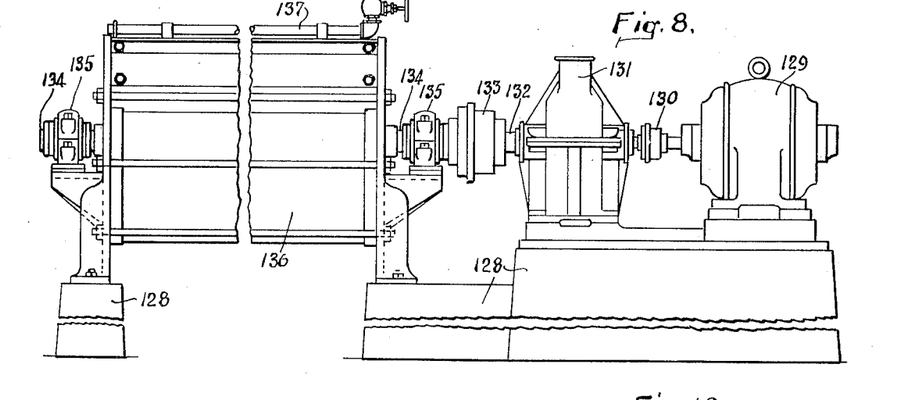
Figure 8 is a side elevation of the mixer with the screen removed, showing the motor, the gear reduction casing and the parallel drive.
Figure 9:
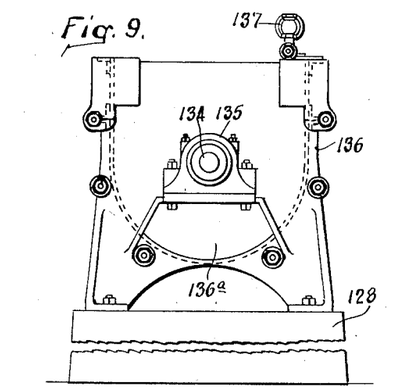
Figure 9 is a view from the lefthand end of Figure 8.
Figure 10:
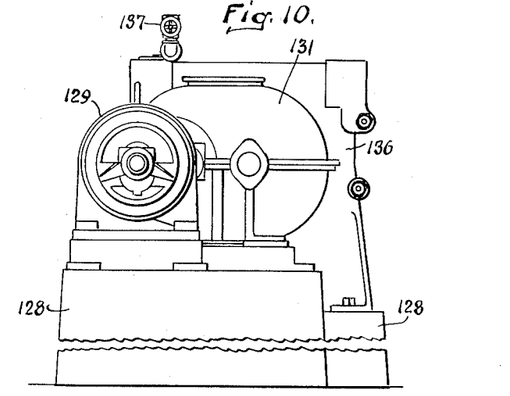
Figure 10 is a view of the righthand end of Figure 8.

In Figures 8 to 12 a mixer is shown with various connections between the motor and the mixer. In Figures 8, 9 and 10 the parts are in alignment with each other. In this form there is provided a base 128 for supporting the various parts of the apparatus. A motor 129 is supported on one part of the base and is connected by means of a shaft and coupling 130 to a reduction gear box 131. Extending from this box is a shaft 132 parallel with the motor shaft and connected by means of a coupling 133 with the shaft 134 supported in suitable bearings 135.

The mixer through which the shaft extends is indicated by the numeral 136 and has at one end a discharge opening 136a, and is supplied by a pipe 137 with water for properly moistening the sand being treated. In this type of mixer the sand is continuously fed, and a continuous supply of water is supplied to the sand. In this respect this form of apparatus differs from that shown in Figures 5, 6 and 7.

Figure 11:
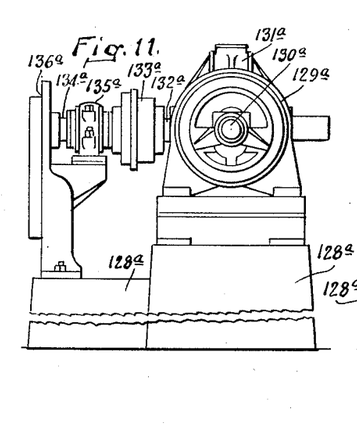
Figure 11 is a view showing the motor and the shaft operated by the motor extending at right angles to the motor shaft for operating the mixer.
Figure 12:
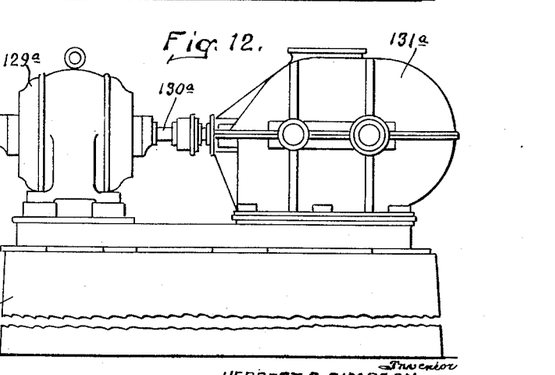
Figure 12 is a view showing the righthand side of the apparatus shown in Figure 11. This figure shows the reduction gear case forming a connection between the motor shaft and the shaft extending at right angles thereto.

In the form shown in Figures 11 and 12 the motor shaft is at right angles to the mixer shaft. The motor 129a is supported on a base 128a and is connected by means of a motor shaft and connection 130a to a reduction gear box 131a, which has extending therefrom a shaft 132a connected by a connection 133a to the mixer shaft 134a supported by bearings 135a. The mixer in this form is indicated by the numeral 136a.

Figures 13, 14, 15, 16:
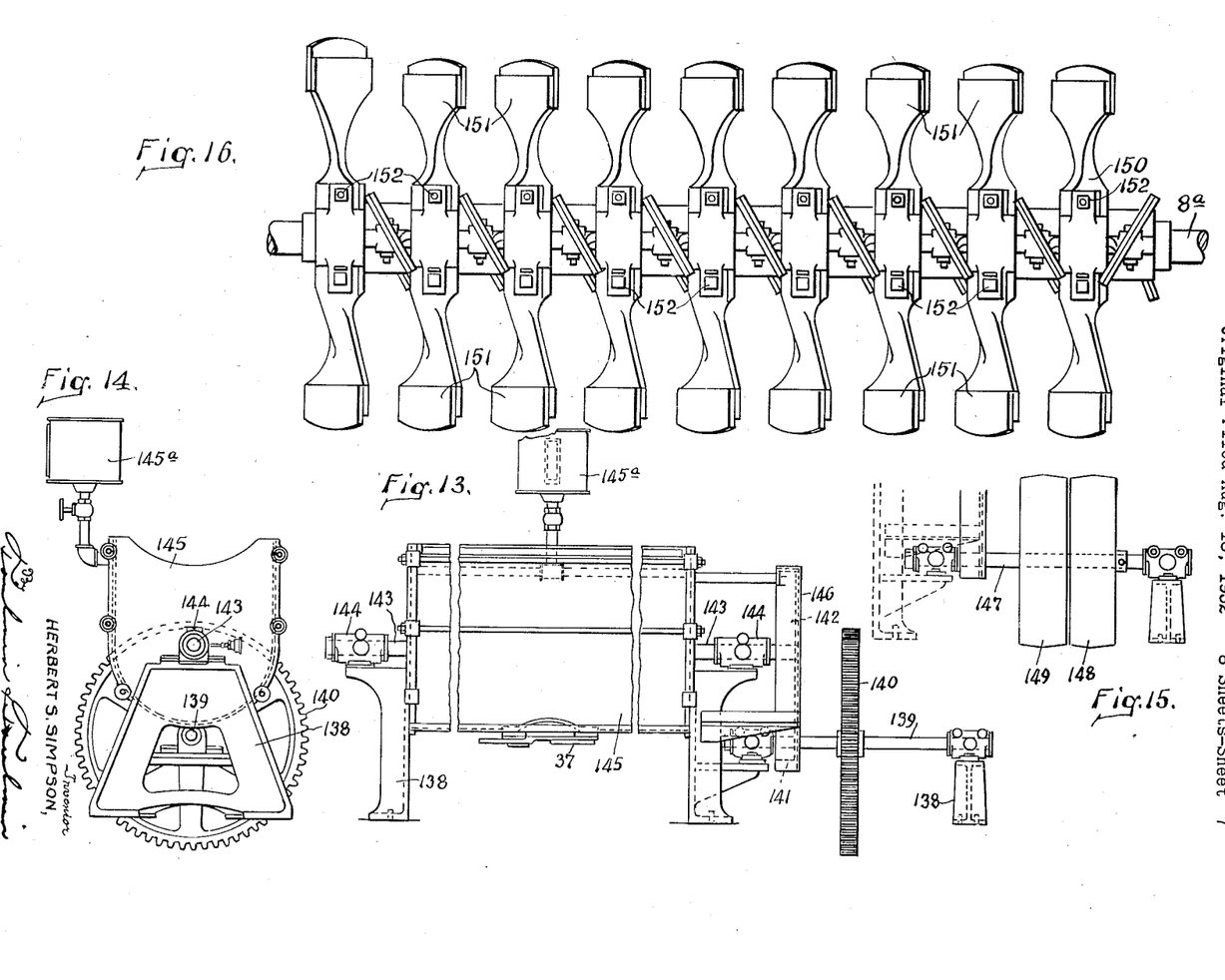
Figure 13 is a side elevation of the mixer with the screen removed, showing a modified form of mixer drive.
Figure 14 is a view showing the lefthand end of the apparatus shown in Figure 13.
Figure 15 is a view showing another modified form of drive for the mixer.
Figure 16 is a view showing one form of paddle and the shaft upon which they are mounted.

In Figure 13 there is shown a modified form of drive for the mixer. In this form there is a plurality of bases or supports 138 for supporting the operating mechanism. Two of these supports support a shaft 139, which has thereon a gear 140 connected to some source of power, and which has on one end a pinion 141 meshing with a gear 142 on a shaft 143. This shaft 143 is supported by bearings 144, and extends through a mixer 145. The pinion 141 and the gear 142 are protected by means of a casing 146. This mixer is of the batch type and has a tank 145a for discharging a definite quantity of water into the mixer.

In the form shown in Figure 15 the shaft 147 for operating a mixer, through any suitable form of gearing, has thereon a fixed pulley 148, and adjacent the fixed pulley a loose pulley 149.

The paddles are located on the shafts disposed longitudinally through the stirrer trough, such as shaft 8a, found in Figures 1 and 2, and shaft 78 of Figures 3 and 4. Each stirrer shaft has thereon a plurality of paddles, each consisting of a stem part 150 and a blade part 151, disposed at an angle to the axis of the shaft upon which the paddles are located. The paddles are fastened in pairs to the shaft by means of bolts 152.

Figures 17, 18, 19:
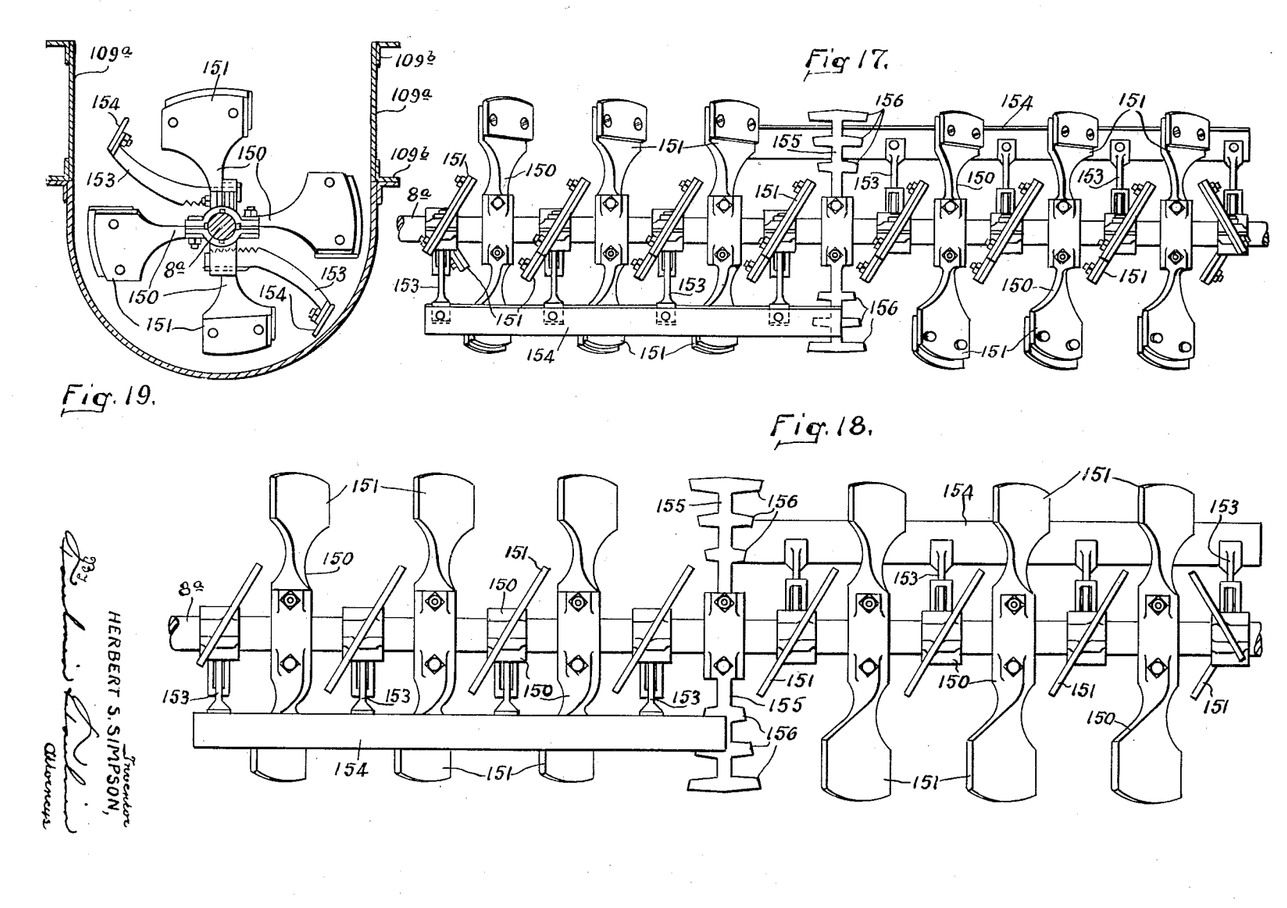
Figure 17 is a view showing the stirrer shaft having a plurality of paddles thereon, arranged in groups, a stirrer between adjacent groups and a scraper associated with each group and supported by the shaft. In this figure the paddles are shown equipped with removable tips.
Figure 18 is a view similar to Figure 17, but showing the paddles without removable tips.
Figure 19 is a section through the parts shown in Figure 17 and the trough in which the paddles rotate.

In the form shown in Figure 16 the paddles are arranged in contact with one another so that a small amount of space is between adjacent paddles. In the form shown in Figures 17, 18 and 19 the paddles are spaced from one another on the shaft. Extending from the stems of certain of these paddles are arms 153, which have on their outer ends spring steel scraper blades 154. The paddles as shown in Figures 17 and 18 are arranged in groups, with a pair of spring steel blades for each group, arranged diametrically opposite each other.

Between the groups of paddles and located on the shaft are agitators 155. These agitators extend in diametrically opposite directions from each other, and each has thereon prongs 156 extending in opposite axial directions and increasing in length from the shaft toward the outer periphery of the stirrer as a whole.

The operation of the blades tends to move the batch of material, sand or whatever it may be, in one direction. The steel blades closely fitting the inner wall of the trough, tend to keep the material toward the center of the stirrer in the vicinity of the shaft. When the material reaches the agitator its movement longitudinally of the shaft is somewhat broken up, so there is at this point a more thorough agitation and mixing of the sand and the water therein. The tips on the ends of the blades are composed of a specially formed material that resists wear, and when worn may be easily removed for the application of new tips.

It will be noted that in the mixer the paddles are assembled on the shaft in pairs, one being slightly smaller and shorter than the other and with a reversed pitch. This arrangement causes the material to be moved in a forward direction by the large blade, while the shorter blade, with the reversed pitch, will cause the material to move backwardly in the mixing trough, thereby effecting an alternating motion of the material from end to end of the mixer, as the material progressively proceeds to the discharge. The fact that the larger blade throws more sand forward than the smaller blade can throw backwardly causes the material to progress to the discharge. This results in the discharge of the material from a stationary trough through the door.

The material is supplied to the door for discharge without jamming or binding due to the relatively small amount of material that is delivered despite the sizes of the paddles, which, if operating all in the same direction, would force all the material towards one end of the trough and jam it so that it would not discharge through the door. This alternating motion of the sand from end to end in the mixing trough together with a smearing action on the material thoroughly infuses the elements of the mix in a very short time so as to secure a rapid and adequate blending of sand mixtures. As the sand is moved in both directions it does not matter whether the discharge is at the middle of the mixing trough as in the case of the batch mixer, or at the end of the mixing trough, as in the case of the continuous mixer. Either discharge is direct into containers or onto conveyors without the necessity of spillage and consequent necessity of rehandling the material.

It will be noted that the clean-out door 37 is in the side of the mixer shell 145. This prevents the building up of the material on the bottom and sides of the trough which would tremendously increase the wear on the paddles and the load on the gearing and motor. This makes it unnecessary to disturb the screen at any time, which is arranged to operate close to the top of the mixer with a minimum of head room and an economy of operating parts.

It will be understood that the problem is to handle effectively very large volumes of sand with low labor costs. Also, the mixer including a feed hopper and apron, elevator, screen and mixer utilizes the minimum of floor space. Also, one man can easily operate the largest capacity unit. It is important to screen the sand thoroughly and it is equally important to uniformly and accurately aerate the sand.

It will be understood that it is desired to comprehend within this invention such modifications as come within the scope of the claims and the invention.

Having thus fully described the invention, what is claimed as new and desired to be secured by Letters Patent, is:

1. A process of mixing foundry sand consisting in feeding sand to a container, moving the sand lying in a plane transverse to the plane of movement of the sand in opposite directions of different magnitude by members moving in the said transverse plane, each movement of the sand in the exit direction being greater than the movement in the opposite direction in the same plane, said movement simultaneously occurring in a plurality of transverse planes extending from the entrance to the exit of said container, and allowing the sand to be forced through an exit.

2. The process of mixing foundry sand which consists in moving the sand from one point to a more elevated point, screening the sand at the elevated point, feeding the sand to a container, moving the sand lying in a plane transverse to the plane of movement of the sand in opposite directions of different magnitude by members moving in the said transverse plane, each movement of the sand in the exit direction being greater than the movement in the opposite direction in the same plane, said movement simultaneously occurring in a plurality of transverse planes extending from the entrance to the exit of said container, applying water to the material during at least a part of the time said sand is being moved, and allowing the sand to be forced through an exit.

HERBERT S. SIMPSON.